Aug. 11, 1959 W. H. HUSER 2,898,996
MACHINE FOR TRIMMING CUP SHAPED ARTICLES
AND THE DIE DRIVE MEANS THEREFOR
Filed July 23, 1956 3 Sheets-Sheet 1

INVENTOR
W. H. HUSER
BY C. B. Hamilton
ATTORNEY

INVENTOR
W. H. HUSER
BY C. h. Hamilton
ATTORNEY

INVENTOR
W.H. HUSER
BY C.H. Hamilton
ATTORNEY

United States Patent Office 2,898,996
Patented Aug. 11, 1959

2,898,996

MACHINE FOR TRIMMING CUP SHAPED ARTICLES AND THE DIE DRIVE MEANS THEREFOR

William H. Huser, Beech Grove, Ind., assignor to Western Electric Company, Incorporated, New York, N.Y., a corporation of New York Application July 23, 1956, Serial No. 599,418

5 Claims. (Cl. 164—47)

This invention relates to machines for trimming articles and more particularly to machines for sequentially trimming walls of articles stamped from sheet metal.

An object of this invention is to provide a machine for trimming walls of stamped sheet metal articles.

Another object of this invention is to provide a machine having an accurately guided die for trimming, piercing or notching articles stamped from sheet metal.

One embodiment of the present invention may include a laterally movable plate for supporting a trimming die which cooperates with another die to trim metal from an article stamped from sheet metal. A cam engages thrust members secured to the plate to reciprocate it sequentially along diameters 90° apart to actuate the trimming die. A plurality of T-shaped guides secured to the plate slide in cross-shaped ways to accurately guide the plate and the trimming die as they are moved.

Other objects and advantages of the invention will become apparent by reference to the following detailed description and the accompanying drawings illustrating a preferred embodiment of the invention, in which Fig. 1 is a plan view of the device with the ram removed and with portions broken away to show the structure of the T-shaped guides and the cross-shaped grooves;

Figure 1:
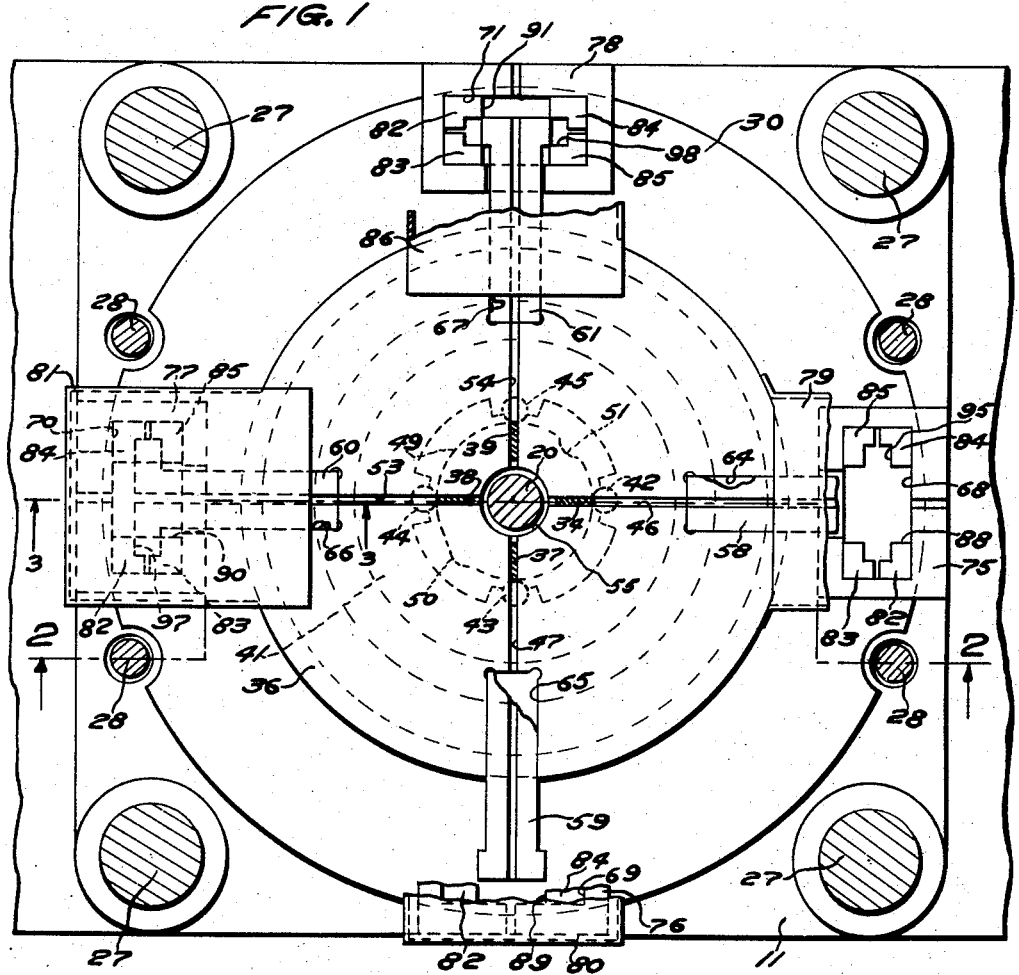
Figure 4:
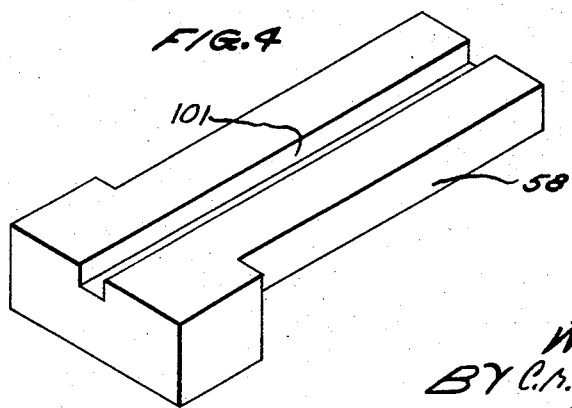
Fig. 4 is an enlarged perspective view of one of the T-shaped guides.

Referring now in detail to the drawings, a base 11 is shown supporting a vertical shaft 12 which is rotatably mounted in bushings 13 and 14 (Fig. 2) in the base 11 and in a base member 15, respectively, supported beneath the base 11. A thrust bearing 16 (Fig. 2) is positioned between the base member 15 and a gear 17 secured to the shaft 12 for supporting the shaft against downward movement. A reduced portion 20 of the shaft 12 projects upward to support a forming die 21 (Fig. 2) which cooperates with a vertically movable die 22 to form a cylindrical article 24 (Fig. 2) from sheet metal stock. The die 22 is carried by a ram 26 slidably mounted on guide rods 27 secured to the base 11 and connected by draw rods 28 to a piston (not shown) of a fluid or air cylinder 52 (Fig. 2) secured to the base member 15 whereby movement of the piston actuates the ram 26. When the piston moves downward the draw rods 28 pull the ram 26 downward along the guide rods 27. Conversely, upward movement of the piston pushes the draw rods 28 upward to raise the ram 26.

A plate 30 secured to the base 11 is provided with a circular aperture 29 and an annular groove 31 for receiving a flange 32 of a ring 33 resting on the base 11, the diameter of the flange 32 being sufficiently less than the diameter of the groove 31 to permit the ring 33 to move laterally on the base 11. A circular wobble plate 36 secured to the ring 33 for movement therewith is provided with a flange 62 (Figs. 2 and 3) which extends over the plate 30 whereby the ring 33 and the wobble plate 36 can move only transversely with respect to the plate 30.

A circular die 40 (Fig. 2) secured to the wobble plate 36 by keys 34, 37, 38 and 39 in keyways 46, 47, 53 and 54 in the plate 36 is provided for cooperating with the die 22 to shear off a portion 23 (Fig. 2) of the article 24 which extends below the die 22. The reduced portion 20 of the shaft 12 extends upward through enlarged apertures 55 and 35 (Figs. 1 and 2) in the wobble plate 36 and the die 40, respectively. An annular member 41 positioned inside the ring 33 is provided with thrust pins 42, 43, 44 and 45 which are engaged by an enlarged portion 49 of the shaft 12 which is provided with a cam surface 50 and a cam relief surface 51 to actuate the ring 33, the plate 36 and the die 40 laterally. A member 48 (Figs. 2 and 3) positioned between the wobble plate 36 and the annular member 41 restricts the wobble plate against vertical movement. A worm gear 56 supported beneath the base 11 and driven by a motor (not shown) meshes with the gear 17 to rotate it through 360° when a clutch (not shown) connecting the motor and the worm gear 56 is actuated.

Straight portions of T-shaped guides 58, 59, 60 and 61 for guiding the wobble plate 36 and the die 40 are secured in recesses 64, 65, 66 and 67, respectively, spaced radially 90° apart in the wobble plate 36 and positioned in radial alignment with the thrust pins 42, 43, 44 and 45, respectively. The T-shaped ends of guides 58, 59, 60 and 61 are positioned in rectangular recesses 68, 69, 70 and 71 in rectangular plates 75, 76, 77 and 78, respectively, secured to the plate 30. The plates 75, 76, 77 and 78 are protected from dust and dirt by covers 79, 80, 81 and 86 secured to the plate 30. The guides 58, 59, 60, and 61 are provided with slots 101, 102, 103 and 104, respectively, aligned with the keyways 46, 47, 53 and 54 for receiving the keys 34, 37, 38 and 39 if it should be desirable to position these keys to engage and hold a die of a size greater than the die 40.

The recesses 68—71 in the plates 75—78 each contain four L-shaped inserts 82, 83, 84 and 85 which form radial slots 88, 89, 90 and 91 which are intersected by transverse slots 95, 96, 97 and 98 for receiving the T-shaped ends of the guides 58—61. When the wobble plate 36 is moved, two of the guides 58 and 60 (or 59 and 61) move radially and the other two 59 and 61 (or 58 and 60) move transversely to the radius upon which they are normally positioned. The T-shaped ends of the radially moving guides 58 and 60 move in the radial slots 88 and 90 and the T-shaped ends of the other two guides 59 and 61 move in the transverse slots 96 and 98. Thus, when the plate 36 is moved to actuate the die 40 each of the guides 58—61 moves in a slot whereby the plate 36 is accurately guided.

Figure 2:
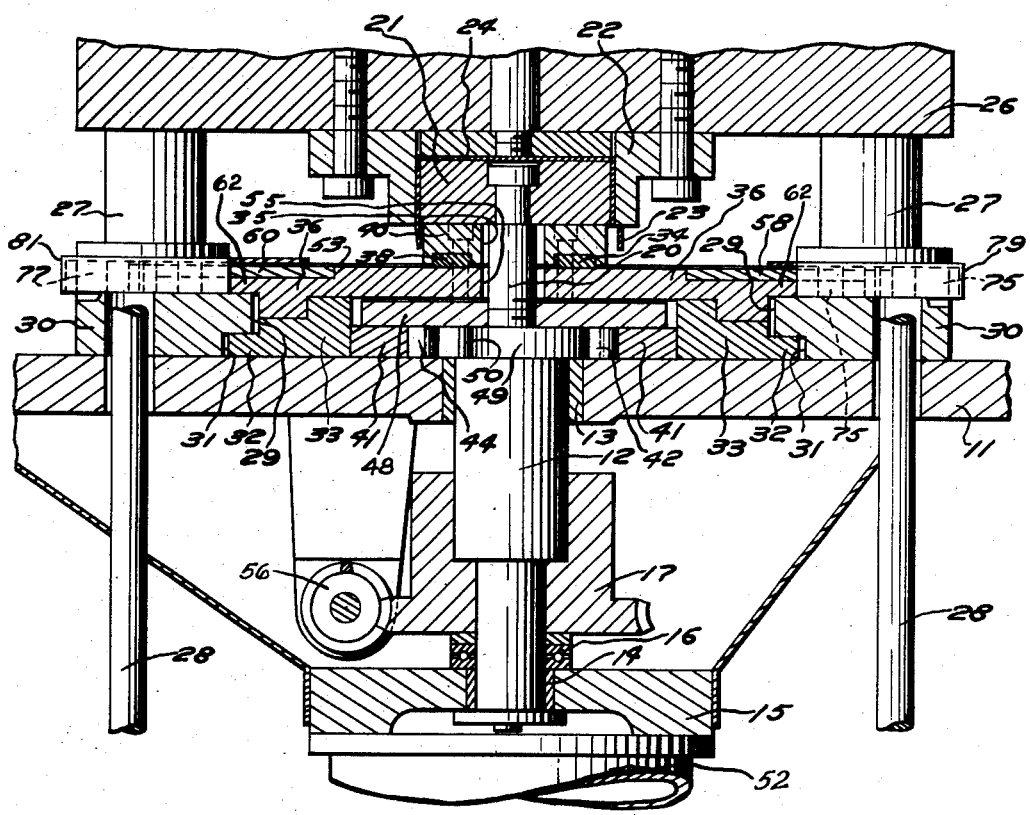
Fig. 2 is a partial vertical sectional view of a trimming machine taken on line 2—2 of Fig. 1 showing in cross-section a sheet metal stamping which has been partially trimmed.
Figure 3:
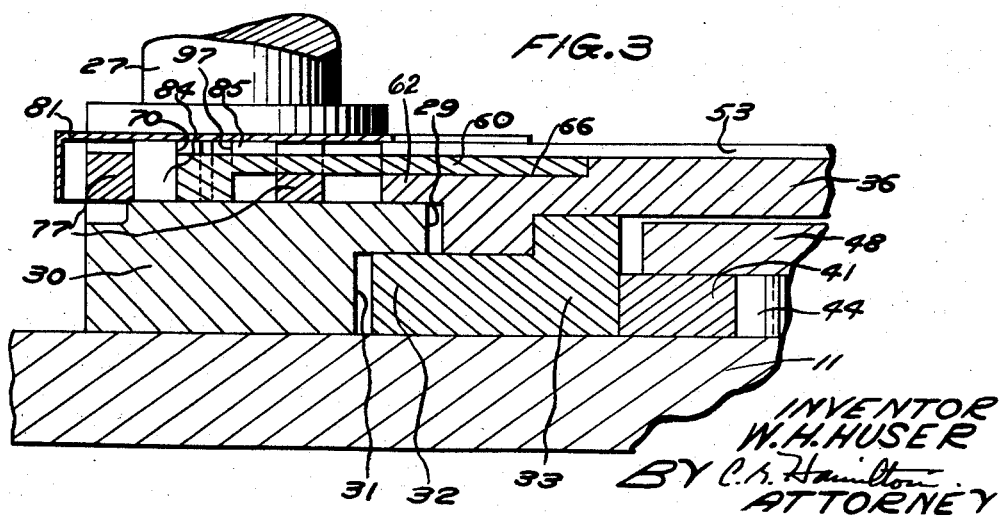
Fig. 3 is an enlarged fragmentary cross-sectional view taken on line 3—3 of Fig. 1.
Figure 5:
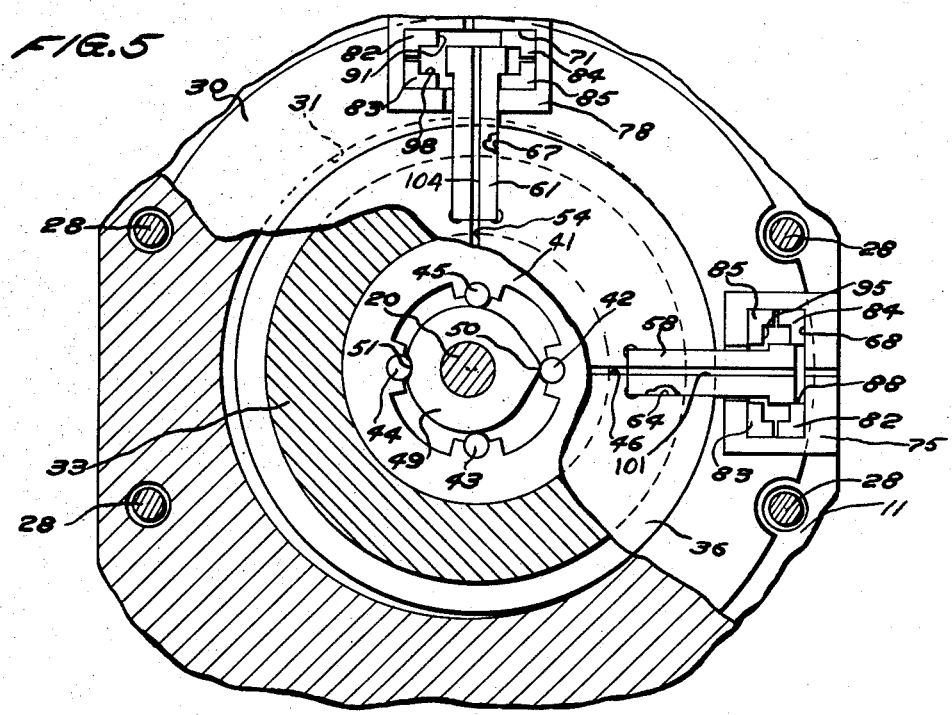
Fig. 5 is a fragmentary plan view showing the position of the T-shaped guides when the wobble plate is moved in one direction.

In operation of the device, a sheet metal blank is positioned on the forming die 21 and fluid is admitted to the cylinder 52 to actuate the piston to lower the ram 26 whereby the vertically movable die 22 cooperates with the die 21 to form the blank into an article 24 (Fig. 2). The ram 26 is held in its lowermost position and the clutch (not shown) is actuated to connect the worm gear 56 to the driving motor (not shown) to rotate the gear 17 and the shaft 12 through 360°. As the shaft 12 rotates, the cam surface 50 engages the thrust pin 42 and forces the annular member 41 laterally to the right as illustrated in Fig. 5. The annular member 41 moves the ring 33, the wobble plate 36 and the die 40 whereby the die cooperates with the die 22 to shear a portion 23 off the article 24 (Fig. 2). During the shearing operation the T-shaped ends of the guides 58 and 60 slide in the radial slots 88 and 90 and the T-shaped ends of the guides 59 and 61 slide in the transverse slots 96 and 98 whereby the wobble plate 36 and the die 40 are accurately guided. After the shearing operation the cam surface 50 passes the thrust pin 42 and the cam relief surface 51 engages the thrust pin 44 to return the wobble plate 36 and the die 40 to its normal centered position. The depth of the cam relief surface 51 is equal to the distance that the T-shaped ends of the guides are displaced from normal centered position during the shearing operation whereby the wobble plate 36 is returned to its normal centered positioned after the shearing operation.

Figure 6:
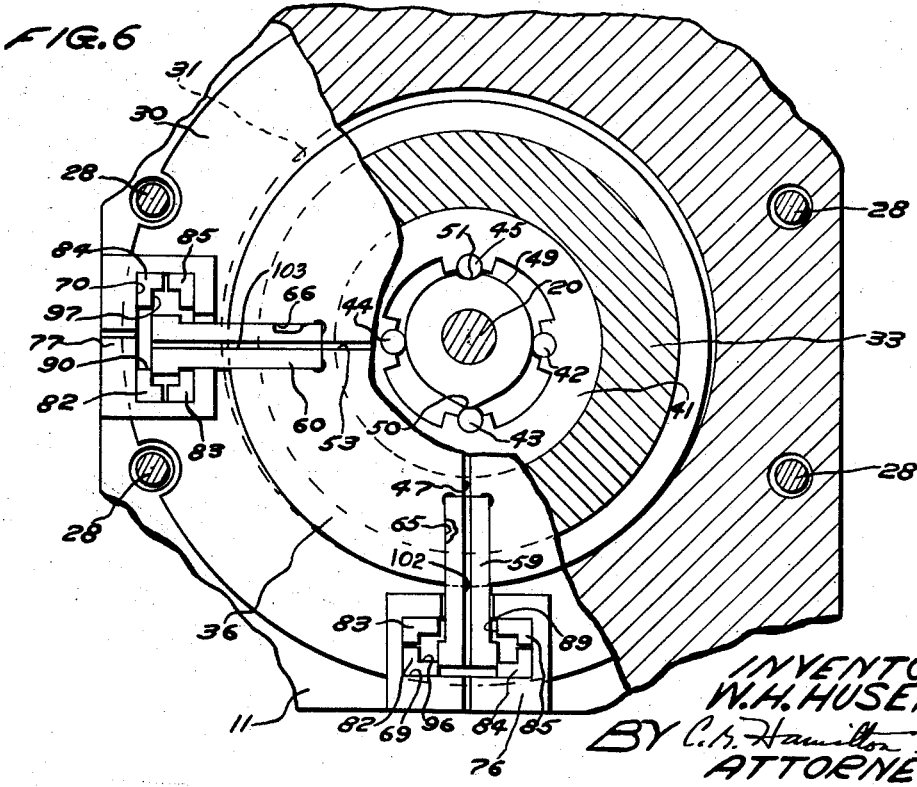
Fig. 6 is a fragmentary plan view showing the position of the T-shaped guides when the cam which moves the wobble plate is rotated 90° clockwise from the position shown in Fig. 5.

The cam surface 50 then engages the thrust pin 43 and moves the annular member 41 to carry the wobble plate 36 and the die 40 downward as seen in Fig. 6. The T-shaped ends of the guides 59 and 61 slide in the radial slots 89 and 91 and the T-shaped ends of the guides 58 and 60 slide in the transverse slots 95 and 97 whereby the die 40 is accurately guided in shearing another segment of the portion 23 from the article 24. The cam surface 50 passes the thrust pin 43 and the cam relief surface 51 returns the die 40 to its normal position.

The cam surface 50 then sequentially engages the thrust pins 44 and 45 and the cam relief surface 51 sequentially engages the thrust pins 42 and 43 whereby the wobble plate 36 and the die 40 are sequentially moved outward and then back to center in the radial directions of the thrust pins 44 and 45.

After the shaft 12 has completed one revolution the clutch (not shown) is actuated to stop the worm gear 56 to thus stop the gear 17 and the shaft 12. The piston in the cylinder 52 is then operated to raise the ram 26 and the die 22, whereupon another sheet metal blank is positoned above the die 21 and the above-described operation is repeated.

It is to be understood that the above-described arrangements are simply illustrative of the application of the principles of this invention. Numerous other arrangements may be readily devised by those skilled in the art which will embody the principles of the invention and fall within the spirit and scope thereof.

What is claimed is:

1. A device for shearing articles, comprising a base having a plurality of parallel cross-shaped grooves, a member spaced from and supported by the base for holding an article, a ram mounted above the base, a first die carried by the ram, a movable plate mounted on the base, a second die mounted on the plate for cooperating with the first die to shear a portion from the article, means on the base for laterally moving the plate and the second die along paths parallel to the cross-shaped grooves, and a plurality of members secured to the plate and having portions slidably mounted in said cross-shaped grooves for guiding the plate and the second die as said plate and second die are actuated by the moving means.

2. A device for shearing portions from articles, comprising a base having a plurality of parallel cross-shaped grooves, a member spaced from and supported by the base for holding an article, a ram mounted above the base, a first die on the ram, a plate slidably mounted on the base, a second die mounted on the plate for cooperating with the first die to shear a portion from the article held in the member, means on the base for moving the plate and the second die in directions parallel to the cross-shaped grooves, and a plurality of members secured to the plate and having T-shaped ends slidably positioned in said cross-shaped grooves for guiding said plate and second die as they are moved by said actuating means.

3. A device for trimming portions from articles, comprising a base having a plurality of parallel cross-shaped grooves, a member mounted above the base for holding an article, a ram mounted above the base, a first die on the ram, a plate slidably mounted on the base, a second die carried by the plate for cooperating with the first die to shear portions from the article held by the member, means on the base for reciprocating the plate from a central position along paths of travel parallel to the cross-shaped grooves, and a plurality of members secured to the plate at points on the paths of travel of said plate, said members having T-shaped ends slidably positioned in the cross-shaped grooves in the base for guiding the plate and the second die as they are reciprocated to shear said portions from the article.

4. A device for shearing portions from articles stamped from sheet material, comprising a base, a member mounted above the base for holding an article, a ram mounted above the base, a first die on the ram, an apertured plate slidably mounted on the base, a second die carried by the plate for cooperating with said first die to shear a portion from the article when the plate is moved on the base, an annular member mounted in the aperture in the plate and having a plurality of cam follower portions, a cam mounted on the base for engaging the cam follower portions of the annular member to reciprocate it and the plate along paths of travel positioned at right angles to each other, said base having a plurality of grooves lying on said paths of travel and a plurality of slots intersecting said grooves at right angles, said grooves and slots being parallel to said paths of travel, and a plurality of members secured to the plate and having T-shaped ends normally positioned at the intersection of said grooves and slots, said T-shaped ends being slidably mounted in said grooves and slots for guiding the plate as it is moved to actuate the second die.

5. A device for shearing articles, comprising a base, a member supported by the base for holding an article, a ram supported above the base, a first die carried by the ram, a second die slidably mounted on the base for cooperating with the first die to shear a portion from the article, means on the base for moving the second die laterally with respect to the first die for shearing said portion, said base having therein a plurality of parallel cross-shaped slots spaced around the second die, said lateral movement of the second die being in a direction parallel to the cross-shaped slots, and a plurality of members secured to the second die and having portions positioned in the cross-shaped slots for guiding the second die as it is actuated.

References Cited in the file of this patent

UNITED STATES PATENTS

| | | |
|---|---|---|
| 2,413,980 | Liss et al. | Jan. 7, 1947 |
| 2,521,975 | Hartup | Sept. 12, 1950 |
| 2,526,163 | Shippy et al. | Oct. 17, 1950 |
| 2,629,439 | Hartup | Feb. 24, 1953 |
| 2,748,862 | Alspaugh | June 5, 1956 |